United States Patent

[11] 3,602,956

[72] Inventors Fletcher C. Eddens
 Mountainbrook;
 Karl F. Reed, II, Homewood, both of, Ala.
[21] Appl. No. 806,216
[22] Filed Mar. 11, 1969
[45] Patented Sept. 7, 1971
[73] Assignee Anderson Electric Corporation
 Leeds, Ala.

[54] CABLE CLAMP
 8 Claims, 20 Drawing Figs.
[52] U.S. Cl. .................................................. 24/125 M,
 339/265 R
[51] Int. Cl. .................................................. F16g 11/04,
 F16g 11/06
[50] Field of Search ........................................... 24/115,
 115.7, 123, 123.1, 123.7, 124, 125, 125 K, 125 L,
 125 M, 125 N, 126; 339/265

[56] References Cited
 UNITED STATES PATENTS
2,026,029 12/1935 Frank ........................... 24/125 X
2,699,462 1/1955 Exner ........................... 24/125 X
2,884,476 4/1959 Lock et al. .................... 24/125 X
3,115,688 12/1963 Smith ........................... 24/125
3,470,528 9/1969 Farrington, Jr. et al. ..... 24/125 X Primary Examiner—John Petrakes
Attorneys—Harold Rathbun and Paul J. Rose ABSTRACT: A cable clamp having an elongate body with a lengthwise groove for receiving the lower side of a cable tensioned under a force $F_2$, and an elongate keeper with an opposed lengthwise groove for application to the upper side of the cable. The lengthwise profile of at least one of these grooves is at least in part convex toward the other groove and when a cable is clamped between the body and the keeper the clamped portion of the cable is compressed and deformed with a total clamping force $F_1$. The curvature of the profile is such that under the forces $F_1$ and $F_2$ there are produced along the clamped length of the cable compressive and tensile stresses $S_1$ and $S_2$ which when combined according to the formula $(S_1+S_2 /2)$ will produce throughout the clamped length of the cable a substantially constant value of shear stress $S_3$ which does not substantially exceed one-half the tensile stress in the cable outside the clamped length. A method for forming such a clamp is also described.

CABLE CLAMP

BACKGROUND OF THE INVENTION

The invention relates to improved suspension and dead end clamps for supporting overhead electrical power lines or cables, viz those utilizing outdoor poles and towers carrying transmission and distribution lines suspended therebetween along the usual catenary curves. Conventional suspension clamps have a grooved body member forming a seat for the suspended cable and a rigid grooved keeper above the cable for clamping purposes. The cable entry portions of the clamp body are curved downwardly to support the cable generally along the catenary curvature and a transition is effected to a straight or flat portion in the area or zone where clamping forces are applied by the keeper. The keeper groove in these conventional clamps is generally straight or flat in profile and of relatively short length. Clamps having clamping forces which are less at the ends of the keeper than at the central portion of the keeper are also known. For example, keepers having tapered end portions to provide flexibility have been suggested, as shown in U.S. Pat. No. 2,031,235. Frequently, however, cable breakage occurs at the ends of the keepers of the clamping members of these conventional clamps and it is sometimes due to fatigue damage resulting from wind induced vibration of the cables. Even small magnitude cyclic vibrations superimposed on high static stress concentrations such as a tightly clamped cable can produce fatigue damage.

Conventional dead end clamps also have keepers with substantially straight or parallel surfaces and straight or parallel mating undergrooves so that the cable is clamped with generally uniform force in the clamping zone.

SUMMARY OF THE INVENTION

Among the several objects of this invention may be noted the provision of cable clamps which apply full clamping force to a suspended cable without excessive static stress on the cable at any point; the provision of such clamps which avoids fatigue damage to the cable; the provision of dead ending clamps which will allow much greater tensile forces to be applied to the cable without breaking the cable in the clamp; the provision of suspension clamps which firmly secure or anchor cables even during the occurrence of substantial unbalanced cable loads; and the provision of a simple and reliable method for forming these clamps. Other objects will be in part apparent and in part pointed out hereinafter.

Briefly, cable clamps of the present invention comprise an elongate body having a lengthwise groove for receiving the lower side of a suspended cable tensioned with a force $F_2$. The cable is nested between the body and an elongate keeper which has a lengthwise groove for application to the upper side of said cable. The lengthwise profile of at least one of said grooves is convex toward the other groove for deformation of the cable when clamped in place between the body and keeper. Clamping means are provided for clamping the body and keeper together to compress, deform and hold the cable therebetween with a total clamping force $F_1$. The profile of the first groove is such in relation to the profile of the other groove that under said forces $F_1$ and $F_2$ there will be produced along the clamped length of the cable material compressive and tensile stresses $S_1$ and $S_2$ respectively which when combined according to the formula $S_3 = S_1 + S_2/2$ will produce throughout the clamped length of the cable a substantially constant value of shear stress $S_3$ which does not substantially exceed one-half the tensile stress of the cable outside the clamped length. Also, the present invention encompasses a method of forming such clamps including steps for determining the profile of the clamp grooves.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
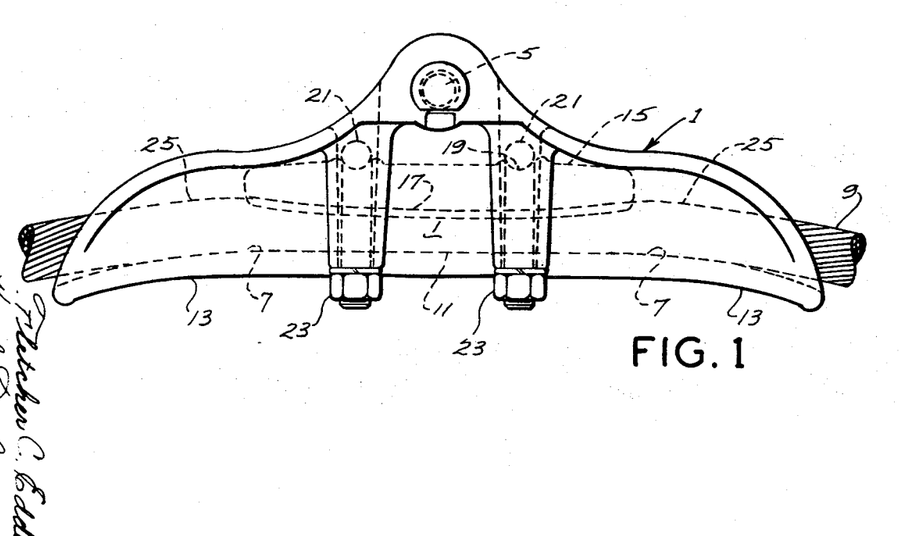
FIG. 1 is a side elevation of a cable suspension clamp made according to this invention.
Figure 2:
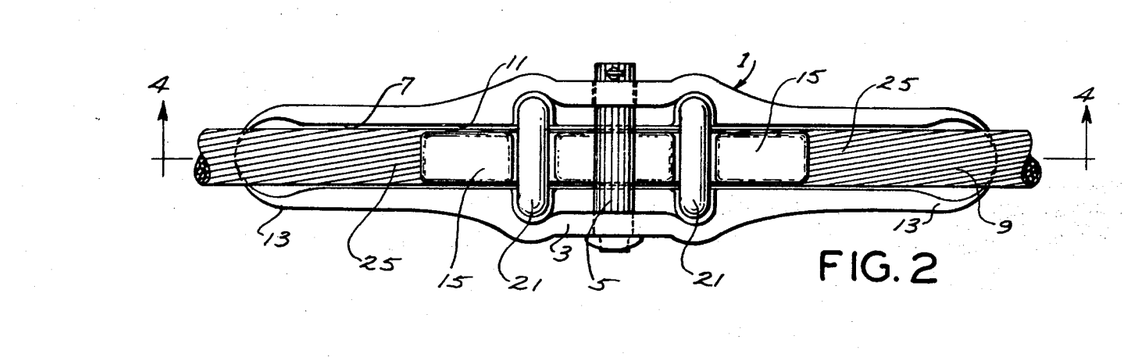
FIG. 2 is a top plan view of the FIG. 1 clamp.
Figure 3:
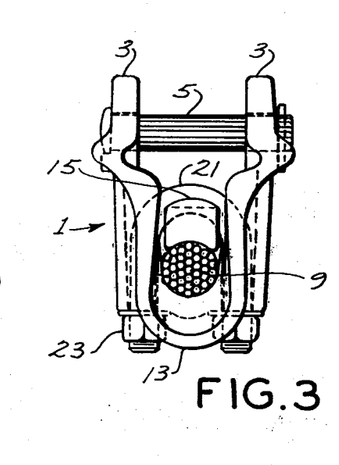
FIG. 3 is an end view of the clamp of FIG. 1.
Figure 4:
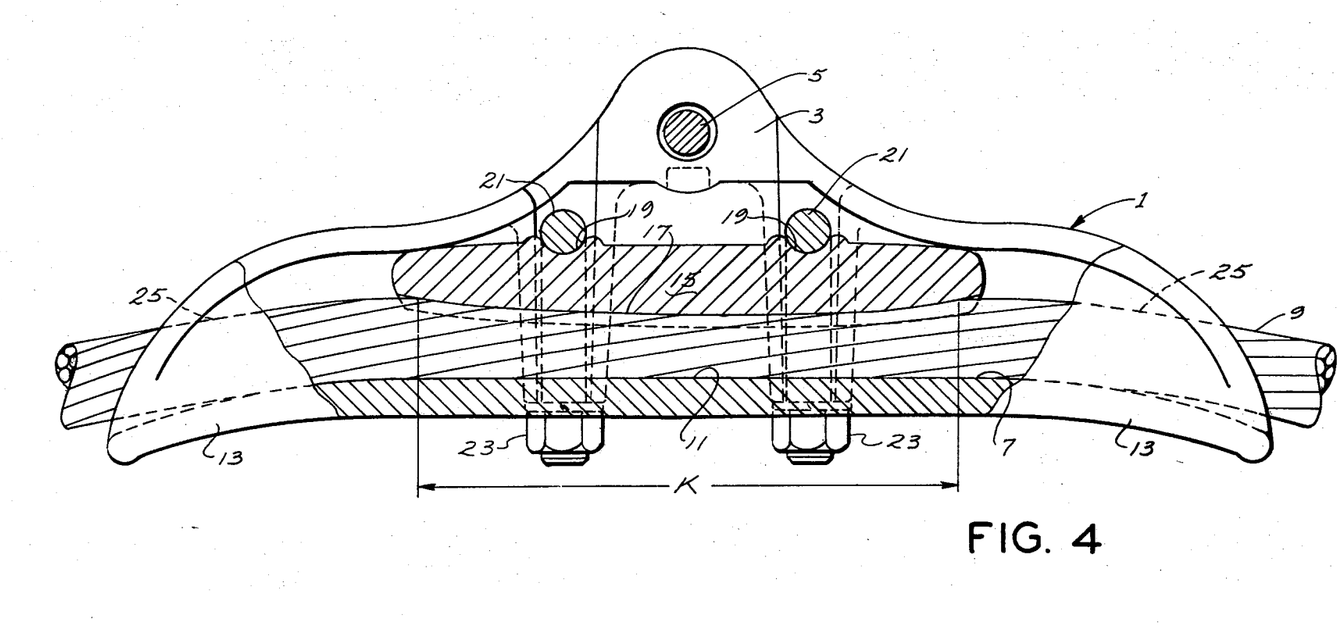
FIG. 4 is a longitudinal section taken on line 4—4 of FIG. 2 and on an enlarged scale, some parts being shown in elevation.

Referring now more particularly to FIGS. 1–4, there is shown at numeral 1 an elongate clamp body having a generally U-shaped central cross section as shown in FIG. 3. The legs of this central U-shaped portion are formed as a clevis 3 which extends upwardly. The clevis has suitable eyes for the reception of a supporting bolt 5. The lower portion of body 1 is in the form of a channel 7 having a semicircular cross section generally being slightly larger in diameter than the diameter of the maximum size of cable 9 to be carried or supported by the clamp. Channel 7 includes a straight groove portion 11 against which the cable is clamped. Channel 7 has bellmouthed entry portions 13 which are curved downwardly to provide transition or lead-in portions at opposite ends of the groove 11 to the clamp from the catenary shapes of a cable when suspended between clamps on adjacent poles or towers. The curvature of portions 13 is contoured in profile with a single or multiple radius typically of approximately six to 12 times the cable diameter. The axis of groove 11 in side profile is preferably made substantially straight, as illustrated.

At numeral 15 is shown an elongate rigid keeper, the bottom of which is grooved lengthwise as shown at 17. In side profile this groove is convex (FIG. 4) toward groove 11. It is similar in cross section to groove 11 as described above. The end portions of the keeper are contoured with suitable radii of about ¼ inch to ½ inch to form smoothly relieved ends. The top of the keeper is formed with notches as shown at 19 for the reception of straddling U-bolts 21. The legs of the U-bolts extend down through suitable openings in the body 1 where they are threaded to receive nuts 23 for drawing down the bolts to force the keeper down on the nested cable 9 and to deform it. The bolts 21 and nuts 23 constitute means for clamping the body and keeper together to compress, deform and hold cable 9 therebetween throughout a clamping length K with a total clamping force $F_1$ which is a function of the torque applied to nuts 23 during tightening. Portions 25 of cable 9 extending over the entry portions 13 are comparatively free, except for some bottom support.

Figure 5:
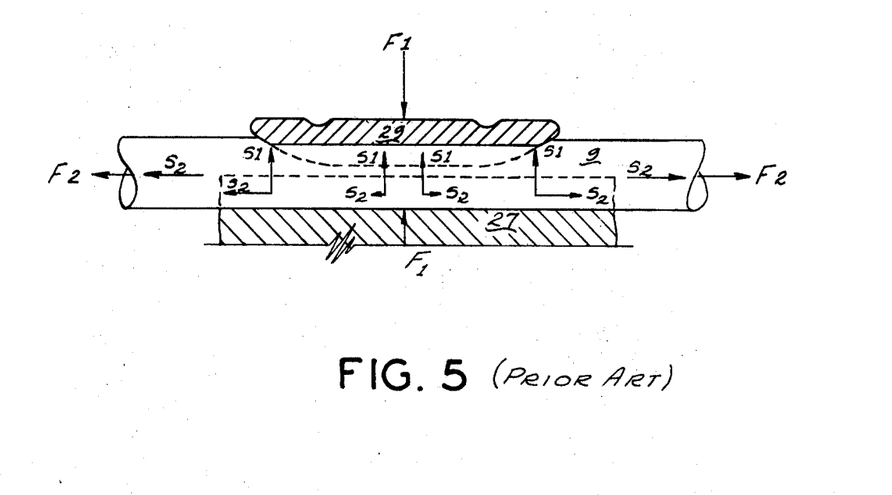
FIG. 5 is a free-body force diagram illustrating external forces and the resulting internal stresses existing in the clamping zone of a straight clamped cable in a prior art suspension clamp.

Referring to FIG. 5, it illustrates a length of cable 9 clamped between a conventional straight grooved support 27 and a straight grooved rigid keeper 29. Thus, when the cable 9 is clamped by drawbolts under force $F_1$, a range of substantially equal compressive stresses $S_1$ will occur in the cable along its clamped length. The values of these stresses $S_1$ are indicated by vectors $S_1$ of equal lengths. Endwise pulling or tension force $F_2$ will result in a bilateral sequence of tensile stresses $S_2$, of increasing lengths from the central plane to the ends of the clamping zone.

The values of the tensile stresses $S_2$ in FIG. 5 vary because of the progressive frictional snubbing action against applied tensile force $F_2$ by friction between straight profile clamping pieces 27 and 29 on the one hand, and the clamped cable 9 on the other hand. The variations are bilaterally symmetrical in a suspension clamp, there being a decrease in the values of $S_2$ from the ends to the middle of the clamped region, as indicated. A combination of the stresses, such as $S_1$ and $S_2$ which are right angularly disposed, manifests itself as a resultant herein referred to as shear stress $S_3$.

If the values of the compressive stresses $S_1$ are all the same along the length of the clamp keeper and the values of the tensile stresses $S_2$ vary, then according to the strength of materials relationship: $S_3 = S_1 + S_2/2$ the values $S_3$ of the combinations will vary. Such variations have the effect of increasing shear stresses at the ends of the clamping zone under the keeper 29 and these stresses may exceed a maximum safe stress value in the cable under high pulling loads. This results in a stress concentration which causes greater liability to fatigue failures, particularly at the keeper ends under wind-induced cyclic vibrations or cyclic stresses due to temperature changes.

Figure 6:
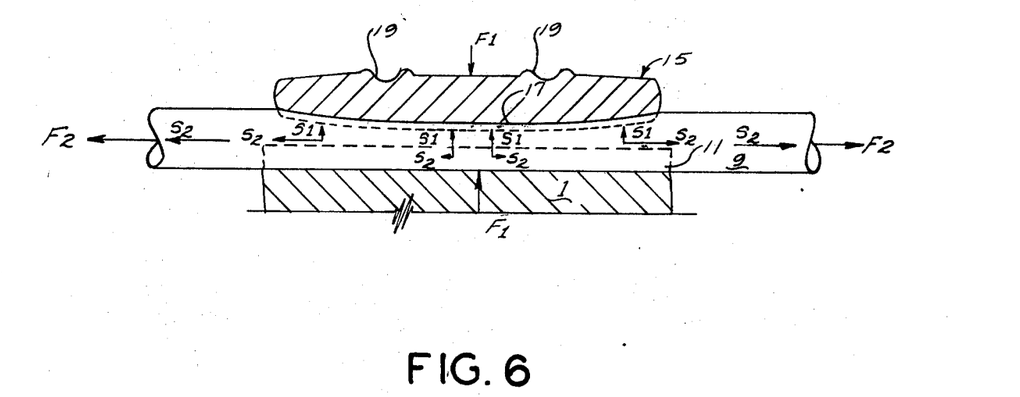
FIG. 6 is a free-body force diagram illustrating the external forces and the resulting internal stresses existing in the clamping zone of a cable clamped in a suspension clamp made according to this invention.

Referring to FIG. 6 the keeper 15 has been provided, as in the construction illustrated in FIGS. 1–4, with curved groove 17 of a particular convex profile which has the result of providing bilateral sequences of compressive stresses $S_1$ of varying values along the length of the keeper. These clamping stress values are larger towards the central portion of the keeper and conversely progressively less towards its outer or end portions, as indicated by the lengths of the vectors $S_2$ in FIG. 6. On the other hand in FIG. 6, as in FIG. 5, the sequences of tensile stresses $S_2$ are as before, due to friction, progressively less in value toward the center of the keeper, as indicated by their vector lengths. More particularly, the convexity of curvature of the groove 17 is such that the value of the shear stress $S_3$ remains substantially constant throughout the clamped length of cable and of a value which does not substantially exceed one-half the tensile stress in the unclamped portion of the cable.

To determine the desired shape of curvature of the groove 17 and the keeper length, certain boundary conditions are established for any given size clamp to accommodate a range of different cable or conductor sizes.

Boundary Condition A

The total clamping force ($F_1$) is selected from known torque-tension relationships for various sizes, materials and types of hardware, for example, different types and sizes of U-bolts and nuts used as clamping means.

Boundary Condition B

The tensile load or force ($F_2$) in the conductor outside the clamp is determined. In practice an arbitrary percentage (e.g., 20 percent—50 percent) of the rated conductor ultimate strength is selected as the tensile load (outside the clamping area) to be held by suspension clamps. For dead end clamps the tensile load is taken at 90 percent—100 percent of rated conductor ultimate strength. Where composite type cables, such as ACSR, are to be supported, one portion, such as the aluminum strand(s) is more subject to fatigue damage than the other cable portion, such as the steel strand(s). In such instances the tensile load and stress in the cable portion more subject to fatigue damage is utilized.

Boundary Condition C

The coefficient of friction ($\mu$) is determined by conventional methods. This is a function of clamp material (e.g., aluminum, bronze, steel, iron, etc.), conductor material (e.g., all aluminum, copper, ACSR, steel, etc.), and the cross-sectional shape of body and keeper. This will be used in the formula,
$$F_f = \mu F_n$$
where $F_f$ = frictional force, and $F_n$ = normal force or clamping force.

Boundary Condition D

The relationship of transverse deformation or indentation of a cable per small unit length of keeper versus unit transverse load is established by usual procedures. This yields data similar to those represented by conventional compressive stress-strain curves on load deformation, but may differ to some extent where the cable is stranded conductor and can compact somewhat.

Boundary Condition E

The maximum allowable compressive stress $S_1$ is established as being substantially equal to the tensile stress in the conductor outside the clamp.

Following is the procedure to determine the desired shape of curvature of the groove 17 and the clamping length of the keeper of a suspension clamp for a 477 MCM 26/7 cable. This clamp will also accommodate other cable types of about the same diameter and somewhat smaller such as 0.86 inch to 0.5 inch. For ACSR conductors, the combined stress problem area is in the aluminum strands. The design of a suspension clamp is symmetrical about the midpoint of the keeper; therefore, the curvature and length will be found for one-half the total length.

Boundary Condition A

The total clamping force ($F_1$) applied will be that resulting from two ½-inch diameter galvanized steel U-bolts with dry nuts torqued to 480 lb. inches—and will be 3,700 lbs.×4 nuts =14,800 lbs. or 7,400 lbs. per keeper half.

Boundary Condition B

The tensile load or force ($F_2$) is equal to 30 percent of rated conductor ultimate strength for the aluminum strands (9,365 lbs.), viz, 0.30×9,365=2,805 lbs.

Boundary Condition C

The coefficient of friction $\mu$ is determined to be 0.50.

Boundary Condition D

Figure 7:
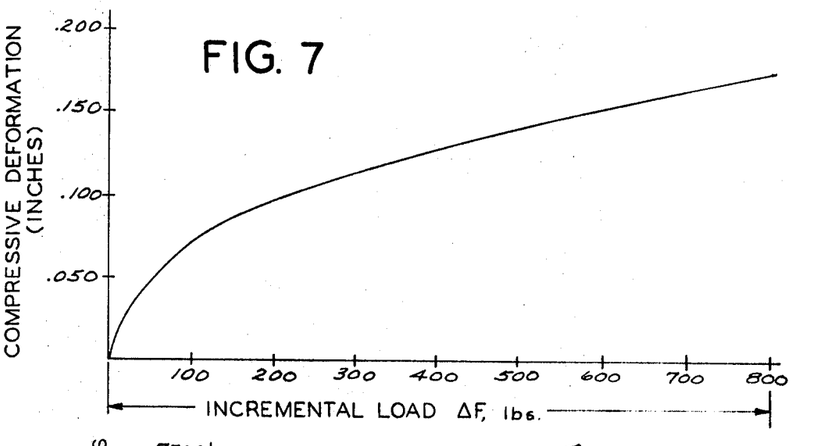
FIG. 7 is a graph showing compressive load versus cable indentation or deformation.

This relationship is shown on the graph of FIG. 7.

Boundary Condition E

The maximum allowable compressive stress $S_1$ is equal to the tensile load $F_2$ divided by the cross-sectional area of the aluminum strands, or 2,805/0.375=7,480 p.s.i. For convenience, -inch unit increments of keeper length were used. This increment length affects the precision of the calculations. The shorter the length, the more precise the results,  inch increments giving quite satisfactory results. This computation may of course be solved by use of a computer and extremely small incremental lengths may be easily used.

Definition of terms used in tabulations and how they are determined.

1. Unit increment number $n$—Numbered increments starting from end of keeper with 0 (zero) being just outside the clamping length or zone of the keeper and proceeding into the clamping zone.

(2) $$S_3(\text{p.s.i.}) = \frac{S_1 + S_2}{2} = \frac{S_1}{2} + \frac{S_2}{2} = \text{shear stress}$$

$$S_{3(o)} = \frac{S_{2(o)}}{2} \text{ because } S_{1(o)} = 0$$

(3) $\frac{S_{2(n)}}{2}$ (p.s.i.) $= \frac{F_{2(n-1)}}{2 \text{ Area}_2} = \frac{1}{2}$ the unit tensile stress (Working with $\frac{1}{2}$ stress to simplify the calculation of $S_3$)

Area$_2$ = Cross section area of aluminum strands in square inches.

For 477 MCM 26/7 cable $$S_2 = \frac{F_2}{.75}$$

4. $(S_1/2(n))(\text{p.s.i.}) = S_{3(n)} - S_{2(n)}/2$
5. $\Delta F_1$ (lbs.) = Unit Compressive Force = $S_1/2$ (2 Area$_1$)
Area$_1$ = Diameter of conductor times the increment length
for 477 MCM 26/7 cable $F_1 = (S_1)/2(0.217)$ 6. $\Delta F_f$(lbs.) = Unit Friction Force = $\mu \Delta F_1$ Where $\mu$ = coefficient of friction determined in boundary condition C
for 477 MCM 26/7 cable in 356–T6 alloy aluminum clamp
$= 0.50$ 7. $\Delta F_2$(lbs.) = Unit Tensile Force (for any given increment ($n$) this equals $\Delta F_{2(n^1)} - \Delta F_{f(n)}$ or unit tensile force of the last increment minus unit frictional force of present increment.

8. Conductor Indentation (Inches)—This was determined as a function of $\Delta F_1$ in boundary condition D and the indentation or deformation at each increment is ascertained from FIG. 7 for the 477 MCM 26/7 cable used in this example.

Procedures used to complete the tabulation of stresses are listed below:

$F_{2(o)}$ was earlier calculated to be 2,805 lbs.
$S_{2(o)}/2 = S_{3(o)} = 2805/0.75 = 3,740$ p.s.i. eqs. 2 and 3
$S_{3(1)}$—assigned 3,790 p.s.i. thus limiting the change in stress at this point.

$$\frac{S_{2(1)}}{2} = \frac{2805}{.75} = 3740 \text{ p.s.i.} \quad \text{Eq. 3}$$

$$\frac{S_{1(1)}}{2} = 3790 - 3740 = 50 \text{ p.s.i.} \quad \text{Eq. 4}$$

$$\Delta F_{1(1)} = (50)(.217) = 11 \text{ lbs.} \quad \text{Eq. 5}$$

$$\Delta F_{f(1)} = 11(.5) = 5 \text{ lbs.} \quad \text{Eq. 6}$$

$$\Delta F_{2(1)} = 2805 - 5 = 2800 \text{ lbs.} \quad \text{Eq. 7}$$

$$\frac{S_{2(2)}}{2} = \frac{2800}{.75} = 3730$$

This procedure is repeated for each treatment. As increment 12 is reached, the following values result:

$S_{3(12)} = 4000$—still holding constant $$\frac{S_{2(12)}}{2} = \frac{2342}{.75} = 3125 \text{ p.s.i.} \quad \text{Eq. 3}$$

$$\frac{S_{1(12)}}{2} = 4000 - 3125 = 875 \text{ p.s.i.} \quad \text{Eq. 4}$$

$$\Delta F_{1(12)} = (875)(.217) = 190 \text{ lbs.} \quad \text{Eq. 5}$$

$$\Delta F_{f(12)} = (90)(.50) = 95 \text{ lbs.} \quad \text{Eq. 6}$$

$$\Delta F_{2(12)} = 2342 - 95 = 2247 \text{ lbs.} \quad \text{Eq. 7}$$

| Unit incrmt. No. | $S_3$ (p.s.i.) | $S_2/2$ (p.s.i.) | $S_1/2$ (p.s.i.) | $\Delta F_1$ (lbs.) | $\Delta F_f$ (lbs.) | $\Delta F_2$ (lbs.) | Cond. ind. in. |
|---|---|---|---|---|---|---|---|
| 0 | 3,740 | 3,740 | | | | 2,805 | |
| 1 | 3,790 | 3,740 | 50 | 11 | 5 | 2,800 | .015 |
| 2 | 3,840 | 3,730 | 110 | 24 | 12 | 2,788 | .032 |
| 3 | 3,890 | 3,720 | 170 | 34 | 17 | 2,771 | .040 |
| 4 | 3,940 | 3,690 | 250 | 54 | 27 | 2,744 | .052 |
| 5 | 3,990 | 3,660 | 330 | 72 | 36 | 2,708 | .061 |
| 6 | 4,000 | 3,610 | 390 | 84 | 42 | 2,666 | .065 |
| 7 | 4,000 | 3,560 | 440 | 98 | 49 | 2,617 | .070 |
| 8 | 4,000 | 3,485 | 515 | 112 | 56 | 2,561 | .075 |
| 9 | 4,000 | 3,420 | 580 | 126 | 63 | 2,498 | .080 |
| 10 | 4,000 | 3,330 | 670 | 146 | 73 | 2,425 | .085 |
| 11 | 4,000 | 3,235 | 765 | 166 | 83 | 2,342 | .090 |
| 12 | 4,000 | 3,125 | 875 | 190 | 95 | 2,247 | .094 |
| 13 | 4,000 | 3,000 | 1,000 | 217 | 109 | 2,138 | .097 |
| 14 | 4,000 | 2,850 | 1,150 | 250 | 125 | 2,013 | .105 |
| 15 | 4,000 | 2,685 | 1,315 | 286 | 143 | 1,870 | .110 |
| 16 | 4,000 | 2,495 | 1,505 | 326 | 163 | 1,707 | .117 |
| 17 | 4,000 | 2,275 | 1,725 | 374 | 187 | 1,520 | .124 |
| 18 | 3,900 | 2,025 | 1,875 | 407 | 204 | 1,316 | .127 |
| 19 | 3,800 | 1,750 | 2,050 | 445 | 223 | 1,093 | .133 |
| 20 | 3,700 | 1,458 | 2,242 | 487 | 243 | 850 | .139 |
| 21 | 3,700 | 1,130 | 2,570 | 558 | 279 | 571 | .148 |
| 22 | 3,700 | 760 | 2,940 | 638 | 319 | 252 | .159 |
| 23 | 3,700 | 336 | 3,364 | 730 | 365 | | .173 |
| 24 | 3,610 | 0 | 3,610 | 783 | | | .179 |
| 25 | 3,610 | 0 | 3,610 | 783 | | | .179 |
| Total $\Delta F_1$ | | | | 7,401 | | | |

This process continues until one of the boundary conditions stops the process. At increment 24 the tensile stress ($S_2$) has become snubbed off to zero. The sum of the incremental compressive forces ($\Delta F_1$) through increment 23 equals 5,835 lbs. Boundary condition A establishes the sum $\Delta F_1$'s to be 7,400 lbs. Therefore, the remaining force 7,400−5,835=1,565 lbs. is divided into incremental loads keeping in mind the desired $S_3$ is to remain substantially constant. Thus the 1,565 lbs. is divided by 2 to supply a $\Delta F_1$ of 783 lbs. for each of the remaining two increments 24 and 25. These 25 increments determine the length of the half clamping zone, the clamping length K being 50 ⅛ inch increments or 6 ¼ inch. The length of the keeper is slightly longer than this, as noted above.

The actual curvature or profile of the groove is then determined simply by laying out a straight line of 6 ¼ inches in length and at the ⅛ increments plotting points spaced away from the straight line by distances respectively equal to the incremental conductor indentation values from the last column of the following table which includes all the values for this particular suspension clamp.

Figure 8:
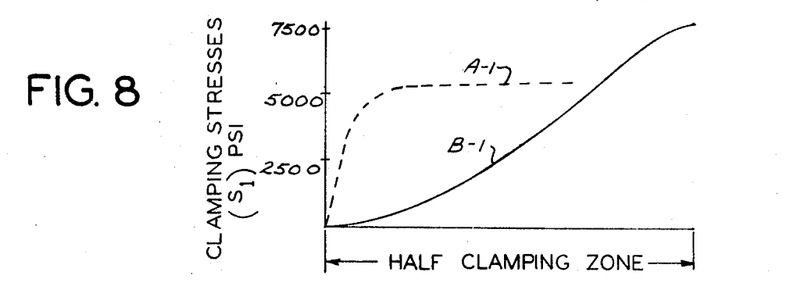
FIG. 8–10 are comparative force-stress curves according to the FIGS. 5 and 6 arrangements.
Figure 9:
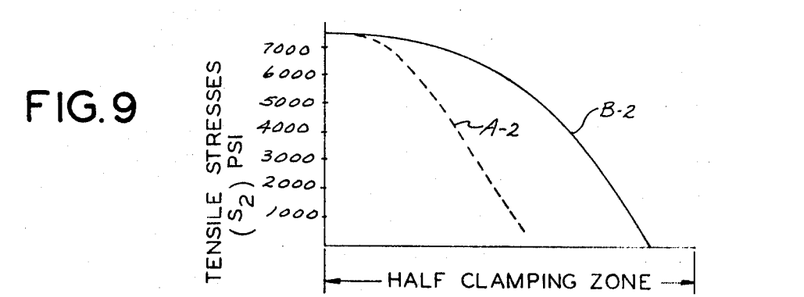
Figure 10:
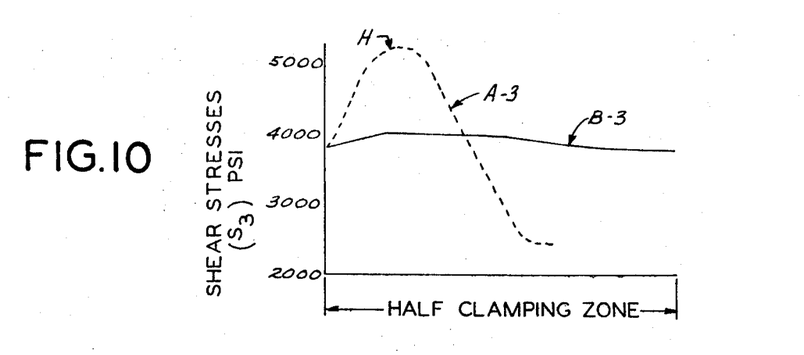

A symmetrical keeper is then formed in accordance with the unique curve obtained above and the body portion of the clamp is formed with a straight groove for the portion of its length corresponding to clamping length K of the suspension clamp. The stress conditions over one-half of a clamping zone for a prior art suspension clamp and a clamp of the present invention are illustrated in FIGS. 8–10. Broken line A-1 (FIG. 8) indicates values of the compressive stresses $S_1$ (due to load $F_1$) along the clamped half-length of a suspension clamp such as shown in FIG. 5, which does not employ the invention.

Solid line B-1 of FIG. 8 indicates the values of corresponding clamping or compressive stresses $S_1$ (due to load $F_1$) existing in the clamped half-length of a suspension clamp of this invention, such as shown in FIGS. 1-4 and 6. In FIG. 9 broken line A-2 indicates the values of tensile stresses $S_2$ due to force $F_2$ in the case of the FIG. 5 clamp while the solid line B-2 indicates corresponding tensile stresses $S_2$ due to force $F_2$ in the FIG. 6 clamp. When corresponding values along broken lines A-1 and A-2 are combined according to the above noted equation, broken line A-3 of FIG. 10 results. This represents induced shear stresses $S_3$. This line shows the undesirable endwise concentration of stress at the hump indicated at H. When curves B-1 and B-2 of FIGS. 8 and 9 are combined according to the above equation, this condition is eliminated as shown by the solid line B-3 in FIG. 10. This presents a substantially horizontal appearance, and indicates a substantially constant value of shear stress $S_3$, which condition thereby eliminates or minimizes cable fatigue damage. Moreover, by thus properly distributing the stresses from tension and compression, as is made possible by the invention, the best possible grip is obtainable on the cable all along its clamped portion. This is not possible when stress concentrations such as represented by hump H are present. Thus clamps made in accordance with the present invention provide much stronger anchoring of the cable than heretofore and accommodate increased unbalanced cable loads, or increased tensile pull on dead end clamps.

Figure 11:
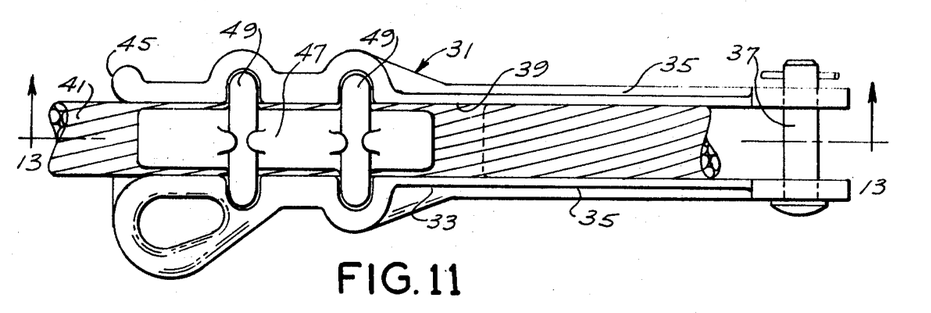
FIG. 11 is a top plan view of a dead end clamp of the present invention.
Figure 12:
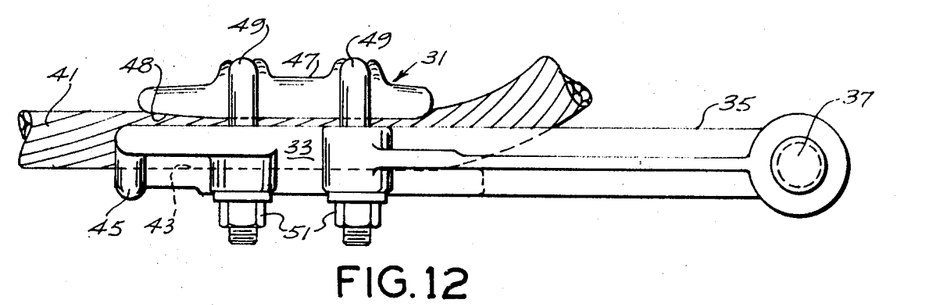
FIG. 12 is a side elevation of the FIG. 11 clamp.
Figure 13:
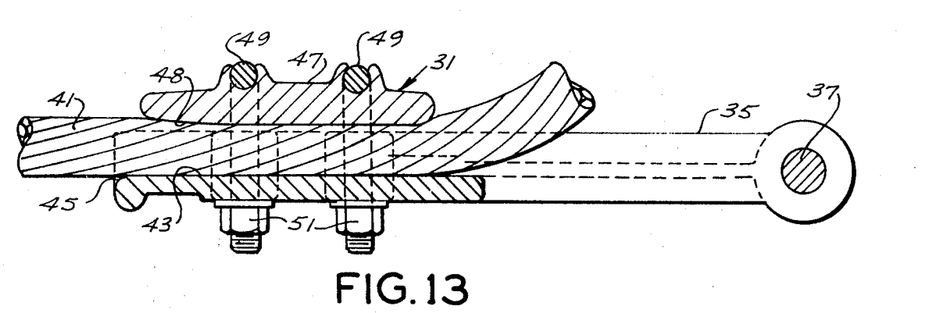
FIG. 13 is a longitudinal section taken on line 13—13 of FIG. 11, some parts being shown in elevation.

Referring now to FIGS. 11-13 a dead end clamp of this invention is indicated generally by numeral 31. This clamp includes an elongate clamp body 33 having a generally U-shaped cross section and having spaced apart clevis arm extensions 35 for securing the clamp body by means of a cross pin 37 to the usual insulator or the like. As in the suspension clamp 1 described above the lower portion of clamp body 33 is in the form of a channel 39 of generally circular cross section slightly greater in diameter than that of the maximum size of cable 41 to be carried or supported by the clamp. Channel 39 has a straight groove portion 43 against which the cable is clamped, and a bellmouthed entry portion 45 which is curved downwardly to provide a transition or lead-in portion at the entry end of the clamp. An elongate rigid keeper for this clamp is indicated at 47, the bottom of which is grooved lengthwise as indicated at 48 and is of a cross section similar to that of groove 17 in suspension clamp keeper 15. The end portions of keeper 47 are contoured with suitable radii of about ¼ inch to ½ inch to form smoothly relieved ends. The top of the keeper has transverse grooves for receiving and retaining U-bolts 49, the ends of which extend through suitable openings in clamp body 33 where they are threaded to receive nuts 51 for drawing down the bolts to force the keeper down on nested cable 41 to deform it along the clamped length thereof.

Figure 14:
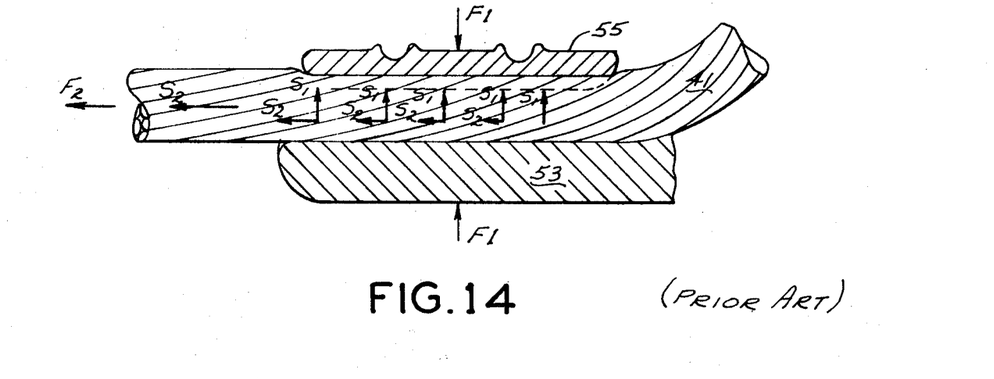
FIG. 14 is a free-body force diagram illustrating external forces and the resulting internal stresses existing in the clamping zone of a straight clamped cable in a prior art dead end clamp.
Figure 15:
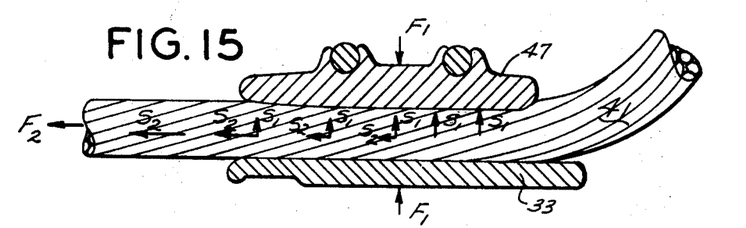
FIG. 15 is a free-body force diagram illustrating the external forces and the resulting internal stresses existing in the clamping zone of a cable clamped in a dead end clamp made according to this invention.

A conventional dead end clamp is illustrated in FIG. 14 wherein cable 41 is clamped between a straight grooved body portion 53 and a straight grooved keeper 55. When the cable is clamped to exert a compressive force $F_1$, compressive stresses will occur along the clamped length of the cable as indicated by the $S_1$ vectors. Endwise pulling or tensile force $F_2$ will effect tensile stresses in this clamped cable portion, vectors $S_2$ indicating the magnitudes thereof, vectors $S_2$ decreasing in value because of the snubbing effect. In similar fashion FIG. 15 diagrammatically illustrates the compressive and tensile force $F_1$ and $F_2$ applied to the clamp and cable in a dead end clamp of this invention, the stresses $S_1$ and $S_2$ in the clamped zone being indicated vectorially. As in the suspension clamp embodiment described above the convexity or curvature of keeper groove 48 is such that the respective sums of the compressive and tensile stress values $S_1$ and $S_2$ are substantially constant throughout the clamped length of the cable and of values which do not substantially exceed half the tensile stress in the unclamped tensioned portion of the cable. It will be noted that the contour of this keeper groove is straight or flat for a substantial portion of its clamping length, but the principles described above apply equally to this dead end keeper as with the suspension clamp keeper.

To determine the proper curvature of the groove and the keeper length for an exemplary dead end clamp of this invention, substantially the same procedure as described above in regard to the suspension clamp is followed. In this instance 2/0 ACSR (which has six aluminum strands and one steel strand) cable is utilized. In a dead end clamp the aluminum strands will be subjected to higher combined stress loading due to greater tensile and clamping forces to which this type clamp is designed. That is, the conductor holding requirements for dead end clamps, because of the completely unbalanced or one-way conductor tensile loading, are much greater than for suspension clamps in which the conductor tensile loading is balanced. Clamping forces are accordingly increased and where composite type cable such as ACSR is used this clamping force is made high enough to prevent the steel core from slipping within the aluminum strands.

The following are specific boundary conditions:

Boundary Condition A

Total clamping force ($F_1$) applied will be that resulting from 2 ½ O.D. galvanized steel U-bolts with lubricated nuts, or 8,250 lbs.×4=33,000 lbs.

Boundary Condition B

The tensile load or force ($F_2$) is made equal to 90 percent of the rated conductor ultimate of 2,560 lbs. for the aluminum strands, or 0.90×2,560=2,300 lbs.

Boundary Condition C

The coefficient of friction is determined to be 0.50.

Boundary Condition D

A compression loading versus compressive deformation graph such as illustrated in FIG. 7, but for 2/0 ACSR is utilized.

Boundary Condition E

The maximum allowable compressive stress $S_1$ is equal to the tensile load $F_2$ divided by the cross-sectional area of the aluminum strands or 2,300 lbs./0.209=11,000 p.s.i.

Figure 16:
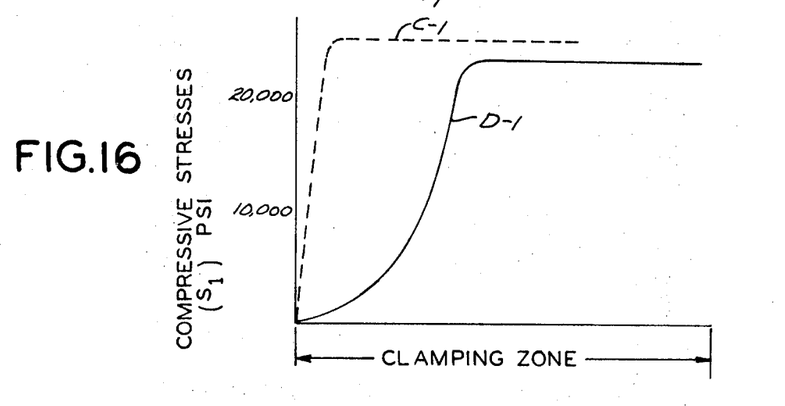
FIGS. 16–18 are comparative force-stress curves according to the FIGS. 14 and 15 arrangements.
Figure 17:
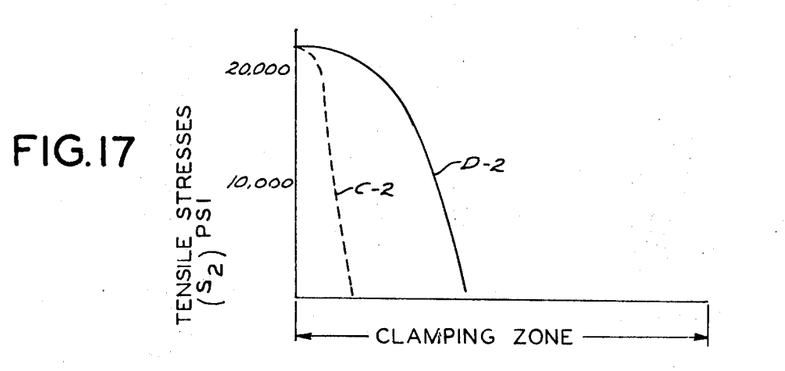
Figure 18:
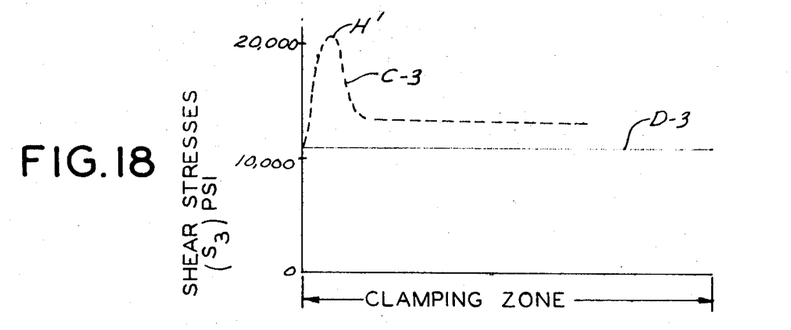

The keeper clamping length was determined to be 4 ½ inches, with a 2 ½ inches long straight groove portion and the remaining 2 inches curved on a contour that maintains a shear stress $S_3$ substantially constant, viz, 10,500 p.s.i. to 11,600 p.s.i. The stress conditions in the clamping zone of a prior art dead end clamp and a dead end clamp of the present invention are illustrated in FIGS. 16-18. A broken line C-1 (FIG. 16) indicates values of compressive stresses $S_1$ due to load $F_1$ along the cable length clamped by a dead end clamp such as is shown in FIG. 14, which does not employ this invention. Solid line D-1 of FIG. 16 indicates the values of corresponding clamping or compressive stresses $S_1$ (due to load $F_1$) existing in the length of cable clamped with a dead end clamp of this invention, such as shown in FIGS. 11-13 and 15. In FIG. 17 broken line C-2 indicates the values of tensile stresses $S_2$ due to force $F_2$ in the case of the FIG. 14 clamp while the solid line D-2 indicates corresponding tensile stresses $S_2$ due to force $F_2$ in the FIG. 15 clamp. When corresponding values along broken lines C-1 and C-2 are combined according to the equation $S_3=(S_1=S_2)/2$, a broken line C-3 of FIG. 18 results. This represents induced shear stresses $S_3$. This line shows the undesirable endwise concentration at the hump indicated at H'. When curves D-1 and D-2 of FIGS. 16 and 17 are combined according to the above equation, this condition is eliminated as shown by the solid line D-3 in FIG. 18. This represents a substantially horizontal appearance and indicates a substantially constant value of shear stress $S_3$ which condition thereby eliminates or minimizes cable fatigue damage. Moreover, by thus properly distributing the stresses from tension and compression, as is made possible by this invention, maximum gripping of the cable is obtained all along its clamped portion and undesirable stress concentrations (such as represented by hump H') are avoided.

Tabulated below are the results of comparative slip and pull out tests performed on dead end clamps of the present invention and on clamps of conventional design to illustrate the improved holding power of the clamps of this invention.

| Cond. (ACSR) | Rated ultimate strength of. cond. (lbs.) | Holding ability convntl. clamp (lbs.)* | Percent of cond. ult. | Holding ability present invn. (lbs.)* | Percent of cond. ult. |
| --- | --- | --- | --- | --- | --- |
| 2/0–6/1 | 5,345 | 4,320 | 81 | 6,030 | 113 |
| 1/0–6/1 | 4,280 | 3,850 | 90 | 5,130 | 120 |
| #6–6/1 | 1,170 | 1,100 | 94 | 1,240 | 106 |

*The test values shown are the average of 3 or more identical tests.

It was noted that in conventional clamps all breaks occurred under the keeper and within the first one-half inch of contact area. In the clamps of this invention, approximately 20 percent of the breaks occurred in midspan with the remainder occurring similar to those in the conventional clamps.

Sustained load tests were also carried out. Such tests simulate actual field loading for extended periods of time. This is similar to tests (SG 14.1) adopted by NEMA (National Electrical Manufacturers Association) for electrical connectors but adapted to dead end clamps. In such tests, clamps are installed in the recommended manner to the opposite ends of a span of conductor. A tensile load equal to 87 percent±2 percent of the rated conductor ultimate strength is applied to the supporting pins or bolts 37. All clamps tested must sustain this loading for a period not less than 168 continuous hours for the clamp to have passed this test. The two conductors hardest to hold in any type of clamp with this clamp's range are (1/0) ACSR and (2/0) ACSR. Clamps of the present invention have held both of these conductors for periods in excess of 1,344 hours (8 times requirement) and did not show any indications of slipping or failure at the time the testing was discontinued. Clamps of conventional design do not meet the requirement of 168 hours due to failure of aluminum strands at points of concentrated stress.

In accordance with the present invention it has been found that the smooth curves of the keeper grooves ascertained by the procedures described above may be determined by another method which will also provide substantially constant shear stress throughout the clamped length of the cable. Stress $S_1$ is selected as a function of the tensile stress $S_2$ in the unclamped portion of a length of cable to be suspended, viz, $S_1$ at the point of maximum deformation of the clamped cable is substantially equal to the tensile stress $S_2$ in the unclamped portion of the cable to be suspended. In practice, and as stated above, an arbitrary percentage (e.g. 20 percent–50 percent) of the rated conductor ultimate strength of the cable is required to be the tensile load held by suspension clamps and 90 percent–100 percent of the rated conductor ultimate strength is required to be held by dead end clamps. Where composite cable is used, only the cross-sectional area and strength of the cable portions (aluminum in ACSR) more subject to fatigue damage are considered. A length of cable of about the maximum size to be clamped is then subjected to that compressive force necessary to effect a compressive stress equal to the tensile stress in the cable outside the clamping zone and tensioned to 20 percent–50 percent (for suspension clamps) or 90 percent–100 percent (for dead end clamps) of the rated conductor ultimate strength of cable (if composite only the strength of the strands of the metal more subject to fatigue damage are considered). The deformation $d$ of the cable is then measured.

Figure 19:
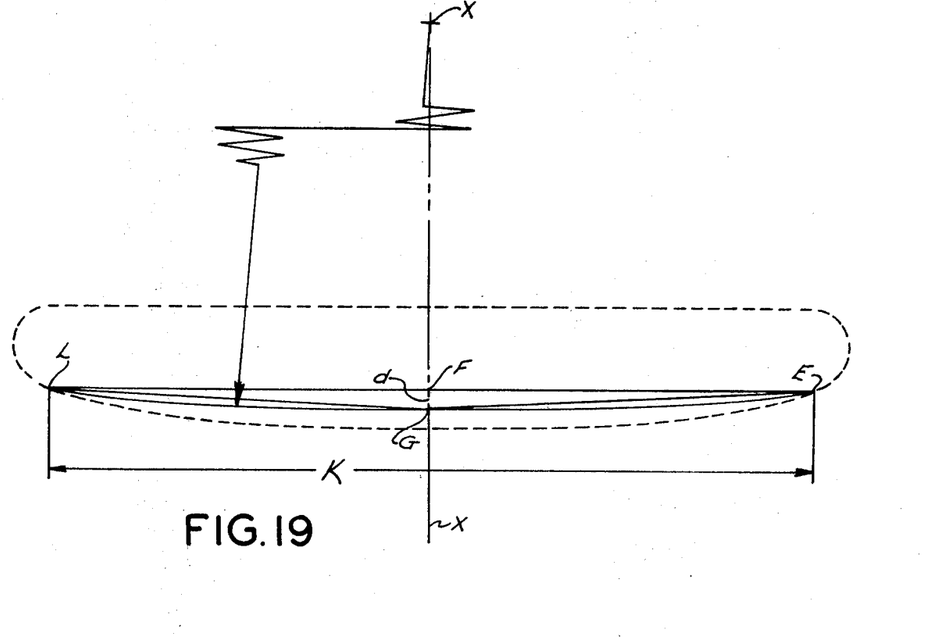
FIG. 19 illustrates steps in a method of forming a suspension clamp of this invention.

The length K of the keeper is a function of the compressive force $F_1$ and the maximum compressive stress $S_1$ within the clamped length of the cable. $F_1$ is determined by the number and size of the clamping bolts to be used and the torquing level to which the nuts will be tightened. By using the following equation:

$$K = 2 \times F_1/S_1(\text{max.}) \times \text{cable diameter}$$

the length K may be ascertained. This deformation $d$, together with the keeper length $K$, is used to ascertain the desired convex curve of the keeper groove of a suspension clamp as follows and as illustrated in FIG. 19. A straight line LE of a length equal to the clamping length $K$ of the keeper is drawn along a central (in plan) longitudinal axis of the keeper and passing the points E and L at which the entering suspended cable will first contact the keeper groove. Through the center point $F$ of line LE a line X—X is drawn perpendicular to line LE. Drop from point F on line X—X a segment FIG. equal to the amount of deformation, this point G thus being offset on line X—X from the axis line LE a distance equal to deformation $d$. A circle is drawn through the points L, G and E, and centered on X—X. Draw chords LG and GE. Any smooth curve drawn in the area defined or bounded by the circular arc LGE and the chords LG and GE will be the profile of the deepest part of the convex groove of the keeper which will produce a substantially constant value of shear stress $S_3$ throughout the clamped length of the cable. The keeper outline is shown in FIG. 19 by the dashed line. The point G thus represents the maximum depth of the keeper along the central longitudinal plane of the keeper (and the point of maximum cable deformation), while points L and E represent the points of the keeper groove at which suspended cable will first contact the keeper, the difference in keeper depths between these two points corresponding to the determined amount of deformation $d$. However, the groove at any transverse section along its length is of a shape snugly to fit the cable upon engagement therewith under initial tightening of the draw bolts.

The groove contours of keepers for dead end clamps of the present invention may be found by a generally similar method. In this instance, the formula used for determining the keeper length is $$K = 4 \times F_1/3 \times S_1(\text{max.}) \times \text{cable diameter}$$

Figure 20:
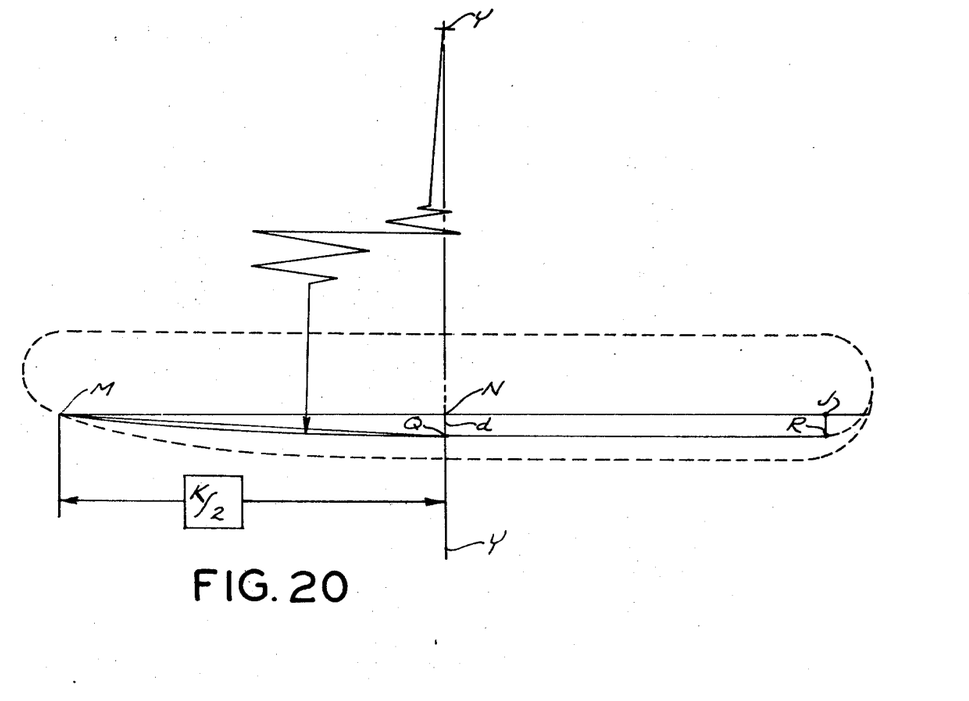
FIG. 20 illustrates steps in a method of forming a dead end clamp of this invention.

The deformation $d$ determined above is used. This method is illustrated in FIG. 20 wherein a straight line MJ having a length equal to K is drawn along a central (in plan) longitudinal axis of the keeper and passing through points M and J, point M being the point at which the entering suspended cable will first contact the keeper groove of this dead end clamp keeper. Through the center point N of the line MJ a line Y—Y is drawn perpendicular to line MJ. Drop from point N on the line Y—Y a segment NQ equal to the amount of deformation $d$, this point Q thus being offset on line Y—Y from the axis line MJ a distance equal to the deformation $d$. A circle is drawn through the points M and Q, and centered on Y—Y. Chord MQ is then drawn. Any smooth curve drawn in the area defined or bounded by the circular arc MQ and the chord MQ will be the profile of the deepest part of the convex groove of the entering portion of the left (FIG. 20) side of the keeper which will produce a substantially constant value of shear stress throughout that clamped portion of the length of the cable. To determine the balance of the profile of this keeper groove (the right portion as shown in FIG. 20) a straight line is drawn between point Q and a point R which is offset as illustrated from point J a distance equal to deformation $d$, line JR being perpendicular to line MJ. It will be noted that in this instance the keeper length K was divided approximately in half between the curved portion on the left of line Y—Y and the straight or flat groove portion on the right side of line Y—Y. It is to be understood that this proportion may be varied somewhat from an even ratio. The keeper outline in FIG. 20 is shown by the dashed line. The line QR thus represents the maximum depth of the keeper along the central longitudinal plane of the keeper (and the zone of maximum cable deformation), while point M represents the point of the keeper groove at which the suspended dead end cable will first contact the keeper, the difference in keeper depths between points M and Q corresponding to the determined amount of deformation $d$.

It is to be noted that symmetrical type keepers can also be used in dead end clamps of the present invention in which event the procedures described above for forming suspension clamp keepers will be utilized. Also, reduced tension dead end clamps, which are designed to hold less than 90 percent to 100 percent of the rated conductor ultimate strength, are also useful.

It is to be understood that the procedures described above and illustrated by FIGS. 19 and 20 are approximations in determining the ideal contours of the grooves of the dead end and suspension clamps of this invention. However, these approximations provide dead end and suspension clamps in which the shear stress $S_3$ is maintained substantially constant, but not as close a tolerance will be realized as with the more precise methods described earlier herein.

Although for best results it is preferred that the keeper groove be shaped in the above manner according to the above description, and the body groove be made flat or straight, it is understood that the body groove may be constructed to have a groove curved as disclosed above while the keeper groove may be made flat or straight; or either groove may be of arbitrary curvature in profile and the other constructed in accordance with the above description and the principles above set out.

It is to be understood that clamping means other than U-bolts, e.g., straight bolts, may be used.

Thus it will be seen that according to the invention the cable is very strongly clamped without imposition of concentrated stresses under which failure from fatigue by vibration or other causes would occur at the ends of its clamped length.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A cable clamp comprising:
an elongate body having a lengthwise groove for receiving the lower side of a suspended cable tensioned with a force $F_2$;
an elongate keeper having a lengthwise groove for application to the upper side of said cable, the lengthwise profile of at least one of said grooves being at least in part convex toward the other groove for deformation of the cable when clamped in place between the body and keeper;
means for clamping the body and keeper to compress, deform and hold said cable therebetween with a total clamping force $F_1$;
said profile being such in relation to the profile of the other groove that under said forces $F_1$ and $F_2$ there will be produced along the clamped length of the cable material compressive and tensile stresses $S_1$ and $S_2$ respectively which when combined according to the formula $S_3=S_1+S_2$/ will produce throughout the clamped length of the cable a value of shear stress $S_3$ which does not substantially exceed one-half the tensile stress in the cable outside the clamped length and which is substantially constant along substantially the entire clamped length of the cable.

2. A clamp according to claim 1 wherein the groove in the body is substantially straight in profile throughout its cable-clamping length and the groove in the keeper has said convex lengthwise profile.

3. A clamp according to claim 2 wherein the groove in the body has at least one cable entry portion extending beyond the clamping portion thereof, said entry portion being curved away from the keeper.

4. A clamp according to claim 2 wherein said clamping means are U-bolts extending through openings in the body and straddling the keeper and cable when in place, and nuts threaded on the bolts below said openings.

5. A dead end clamp according to claim 1 wherein the keeper groove is straight for at least one portion of the clamping length thereof.

6. A method of making a cable clamp having an elongate body with a lengthwise groove for receiving the lower side of a suspended cable and an elongate keeper having a lengthwise groove for application to the upper side of said cable, said method comprising:
determining the amount of deformation of the cable at a compressive stress substantially equal to the tensile stress in the cable outside the length of the cable to be clamped;
selecting a compression force to be applied to the cable throughout the length thereof to be clamped;
determining the length of the keeper as a function of said compressive force and said compressive stress;
forming a grooved keeper substantially of said length for the clamp, the lengthwise profile of at least a substantial portion of the groove being a smooth curve lying within an area defined by an arc of a circle and the chord of that arc, the circle being centered on a line perpendicular to a longitudinal axis of the keeper which passes through the point at which the entering suspended cable will first contact the keeper groove, the circle passing through said point and a second point on said line offset from said axis by a distance substantially equal to said deformation, said chord and arc being terminated by said points; and forming an elongate body having a groove which is straight for the portion of its length corresponding to the length of said clamping portion of the keeper.

7. A method as set forth in claim 6 in which the clamp is a dead end clamp and the compressive force applied is that which will effect a compressive stress in the supported cable at the point of maximum cable deformation which stress is substantially equal to the tensile stress in such cable outside the clamped length thereof when tensioned substantially to the rated conductor ultimate strength of the cable.

8. A method as set forth in claim 6 which the clamp is a suspension clamp and the compressive force applied is that which will effect a compressive stress in the supported cable at the point of maximum cable deformation which stress is substantially equal to the tensile stress in such cable outside the clamped length thereof tensioned to approximately 20 percent–50 percent of the rated conductor ultimate strength.

UNITED STATES PATENT OFFICE

CERTIFICATE OF CORRECTION

Patent No. 3,602,956      Dated December 9, 1971

Inventor(s) Fletcher C. Eddens and Karl F. Reed II

It is certified that error appears in the above-identified patent and that said Letters Patent are hereby corrected as shown below:

In the ABSTRACT, "$(S_1 + S_2/2)$" should read -- $\frac{S_1 + S_2}{2}$ --. Col. 1, line 64 and Col. 3, line 26, "$S_1 + S_2/2$" should read -- $\frac{S_1 + S_2}{2}$ -- Col. 2, line 49, after "a" insert --central--. Col. 3, line 10, after "$S_2$," insert --the values of which are indicated by vectors $S_2$--; line 35, after "with" insert --the--. Col. 4, lines 64 and 66, "**" should read --1/8--. Col. 5, line 17, "$S_2$" should read --$S_2/2$--; line 20, "$(S_1/2(n)$" should read --$S_{1(n)}/2$-- and "$S_{2(n)}2$" should read --$S_{2(n)}/2$--; line 21, "$S_1/2 \ (2 \ Area_1)$" should read --$S_1(2 \ Area_1)/2$--; line 48, "$(S_1)/2 \ (0.217)$" should read --$(S_1)(0.217)/2$--; line 56, "$\Delta F_{2(n^1_1)}$" should read --$\Delta F_{2(n-1)}$--. Col. 6, line 8, "treatment" should read --increment--; lines 24-46, the table should follow line 66. Col. 8, line 64, "$(S_1=S_2)/2$" should read --$(S_1 + S_2)/2$--.

Col. 11, lines 53-54, "$S_1 + S_2/$" should read --$(S_1 + S_2)/2$--. Col. 12, line 51, after "6" insert --in--.

Signed and sealed this 25th day of April 1972.

(SEAL)
Attest:

EDWARD M. FLETCHER, JR.      ROBERT GOTTSCHALK
Attesting Officer              Commissioner of Patents